United States Patent
Liu et al.

(10) Patent No.: US 10,008,244 B2
(45) Date of Patent: Jun. 26, 2018

(54) METHOD FOR SYNCHRONOUSLY ACCESSING AUDIO DATA AND AUDIO PLAYBACK SYSTEM USING THE SAME

(71) Applicant: Jumplux Technology Co., Ltd, Hsinchu Science Park (TW)

(72) Inventors: Yo-Chung Liu, Hsinchu Science Park (TW); Jui-Chin Lai, Hsinchu Science Park (TW)

(73) Assignee: JUMPLUX TECHNOLOGY CO., LTD., Hsinchu Science Park (TW)

( * ) Notice: Subject to any disclaimer, the term of this patent is extended or adjusted under 35 U.S.C. 154(b) by 0 days. days.

(21) Appl. No.: 15/591,599

(22) Filed: May 10, 2017

(65) Prior Publication Data

US 2017/0330599 A1 Nov. 16, 2017

Related U.S. Application Data

(60) Provisional application No. 62/336,502, filed on May 13, 2016.

(51) Int. Cl.

| H04B 1/20 | (2006.01) |
|---|---|
| G11B 27/34 | (2006.01) |
| G11B 27/034 | (2006.01) |
| G11B 23/04 | (2006.01) |
| G11B 31/02 | (2006.01) |
| G11B 27/00 | (2006.01) |
| G11B 31/00 | (2006.01) |
| H04H 60/04 | (2008.01) |

(52) U.S. Cl.
CPC .......... *G11B 27/34* (2013.01); *G11B 27/034* (2013.01); *G11B 23/049* (2013.01); *G11B 27/002* (2013.01); *G11B 31/00* (2013.01); *G11B 31/02* (2013.01); *H04B 1/205* (2013.01); *H04B 1/207* (2013.01); *H04H 60/04* (2013.01); *H04R 2227/005* (2013.01)

(58) Field of Classification Search
None
See application file for complete search history.

(56) References Cited

U.S. PATENT DOCUMENTS

| 5,917,782 A * | 6/1999 | Kim | G11B 7/0037 369/30.23 |
|---|---|---|---|
| 2003/0039178 A1 * | 2/2003 | Sugiyama | G11B 27/002 369/30.19 |
| 2004/0234000 A1 * | 11/2004 | Page | H04J 3/00 375/259 |

(Continued)

*Primary Examiner* — Tan X Dinh
(74) *Attorney, Agent, or Firm* — Muncy, Geissler, Olds & Lowe, P.C.

(57) ABSTRACT

A method for synchronously accessing audio data and an audio playback system using the same are provided. The method comprises: providing a first device and a second device; providing an audio common memory in the second device; transmitting an audio data from the first device to the second device when the second device performs an audio playback; writing the audio common memory by the first device and reading the audio common memory by the second device when the first device transmits the audio data to the second device; and performing an interpolation operation by the second device when a difference between a read address value of the second device and a write address value of the first device is different from a predetermined difference.

20 Claims, 7 Drawing Sheets

(56) References Cited

U.S. PATENT DOCUMENTS

| | | | |
|---|---|---|---|
| 2010/0002683 A1* | 1/2010 | Miljkovic | G06F 1/10 370/352 |
| 2012/0224712 A1* | 9/2012 | Shiba | G11B 20/00007 381/77 |
| 2014/0334644 A1* | 11/2014 | Selig | H03G 5/165 381/108 |
| 2015/0078575 A1* | 3/2015 | Selig | H04R 1/1091 381/74 |
| 2016/0299737 A1* | 10/2016 | Clayton | G06F 3/165 |
| 2017/0277507 A1* | 9/2017 | Ando | G06F 3/165 |

\* cited by examiner

METHOD FOR SYNCHRONOUSLY ACCESSING AUDIO DATA AND AUDIO PLAYBACK SYSTEM USING THE SAME

BACKGROUND OF THE INVENTION

Field of the Invention

The present invention relates to the memory accessing and audio signal processing technology, and more particularly to a method for synchronously accessing an audio signal and an audio playback system using the same.

Description of the Related Art

At present, the smart phone becomes popularized, and many electronic devices need to jump off the old use in order to combine with the function of the smart phone, thereby inducing new technology coordinating with the smart phone. Taking a vehicle sounder as an example, not only the playback of the memory card or the audio data on the optical disk is needed, but also the connection with the smart phone is required to directly playback the audio data transmitted from the smart phone.

Due to the errors caused by the manufacturing processes, the host (e.g. the smart phone) transmitting the audio data and the host (e.g., the automobile head unit) receiving and playing back the audio data tend to have different oscillator frequencies. Because the receiving end and the transmitting end have different oscillator frequencies, the sampling frequencies of the two ends become mismatched, so that the sound off or delayed playback occurs when the automobile head unit is playing back the real-time audio.

In the ordinary conventional communication technology, when the sampling frequency mismatch between the transmitting end and the receiving end occurs, the transmitting end and the receiving end resample to change the sampling rate. The resampling technology needs to know the sampling rates of the two ends in advance, the transmitting end firstly performs up-sampling, and then the receiving end performs down-sampling on the received digital signal. However, resampling must re-compute the data on each point, and the huge computation amount reduces the performances of the receiving end and the transmitting end.

Meanwhile, in the condition of the above-mentioned application, the smart phone transmitting the audio data cannot actually predict the offset of the oscillator frequency in the automobile head unit playing back the audio data. In other words, the receiving end and the transmitting end cannot change the sampling rate by way of resampling.

Thus, the technology of synchronously accessing the audio data to solve the mismatch problem of the sampling frequency is needed without increasing the computation amount.

SUMMARY OF THE INVENTION

An objective of the present invention is to provide a method for synchronously accessing an audio data and audio playback system using the same to solve the sound off or audio delay phenomenon caused by different oscillation frequencies.

In view of this, the present invention provides a method for synchronously accessing audio data and audio playback system using the same. The method for synchronously accessing the audio data comprises the steps of: providing a first device and a second device; providing an audio common memory in the second device; transmitting the audio data from the first device to the second device when the second device performs an audio playback; writing the audio common memory by the first device and reading the audio common memory by the second device when the first device transmits the audio data to the second device; and performing an interpolation operation by the second device when a difference between a read address value of the second device and a write address value of the first device is different from a predetermined difference.

The present invention further provides an audio playback system. The audio playback system comprises a first device and a second device. The second device is electrically connected to the first device through an interface, and comprises an audio output device, an audio common memory and a control circuit. When the second device performs an audio playback, the first device transmits an audio data through the interface to the audio common memory of the second device. The control circuit is coupled to the audio common memory and the audio output device. When the first device transmits the audio data to the second device, the first device writes the audio common memory, the control circuit of the second device reads the audio common memory and performs a playback through the audio output device. When a difference between a read address value of the second device and a write address value of the first device is different from a predetermined difference, the control circuit of the second device performs an interpolation operation.

In the method for synchronously accessing the audio data and the audio playback system using the same according to the preferred embodiments of the present invention, the control circuit judges whether the difference between the read address value of the second device and the write address value of the first device is greater than the predetermined difference, a point deleting operation is performed when the difference between the read address value of the second device and the write address value of the first device is greater than the predetermined difference, and a point interpolating operation is performed when the difference between the read address value of the second device and the write address value of the first device is smaller than the predetermined difference.

In the method for synchronously accessing the audio data and the audio playback system using the same according to the preferred embodiments of the present invention, the audio data comprises multiple sampling point data, the control circuit determines a specific sampling point data from the sampling point data to perform the point interpolating operation, the control circuit performs a digital filter computation according to neighboring M sampling point data of the specific sampling point data and generates (M+1) new sampling point data. The sampling point data are represented as Data[i]. The new sampling point data obtained after the point interpolating operation are represented as NewDate[i], where $NewDate[i] = C_{i,1} \times Data[i-1] + C_{1,2} \times Data[i]$, and $NewDate[0] = Date[0]$, where "i" denotes a time index, "i" is a positive integer ranging from 1 to M, $C_{i,1}$ and $C_{i,2}$ denote weighting coefficients, $C_{i,1}$ and $C_{i,2}$ are real numbers and M is a natural number.

In the method for synchronously accessing the audio data and the audio playback system using the same according to the preferred embodiments of the present invention, the control circuit further comprises a counter, the control circuit determines the number of point(s) of the sampling point data to be interpolated in the point interpolating operation according to the difference between the read address value of the second device and the write address value of the first device, a single point interpolating operation is performed to interpolate one sampling point data when the number of point(s) of the sampling point data to be interpolated is equal to 1, and a time-diversified point interpolating operation is performed when the number of point(s) of the sampling point data to be interpolated is greater than 1. In the time-diversified point interpolating operation, the control circuit firstly performs the single point interpolating operation, and then when counting of the counter expires each time, the control circuit performs the single point interpolating operation until a count of performing the single point interpolating operation is equal to the number of point(s) of the sampling point data to be interpolated.

In the method for synchronously accessing the audio data and the audio playback system using the same according to the preferred embodiments of the present invention, the audio data comprises multiple sampling point data, the control circuit determines a specific sampling point data from the sampling point data to perform the point deleting operation, wherein the control circuit performs a digital filter computation according to neighboring (M+1) sampling point data of the specific sampling point data and generates M new sampling point data. The sampling point data are represented as Data[i], the new sampling point data obtained after the point deleting operation are represented as NewDate[i], where NewDate[i]=$W_{i,1}$×Data[i]+$W_{i,2}$×Data[i+1], and NewDate[0]=Date[0], where "i" denotes a time index, "i" is a positive integer ranging from 1 to M, $W_{i,1}$ and $W_{i,2}$ denote weighting coefficients, $W_{i,1}$ and $W_{i,2}$ are real numbers and M is a natural number In the method for synchronously accessing the audio data and the audio playback system using the same according to the preferred embodiments of the present invention, the control circuit further comprises a counter. The control circuit determines the number of point(s) of the sampling point data to be deleted in the point deleting operation according to the difference between the read address value of the second device and the write address value of the first device. A single point deleting operation is performed when the number of point(s) of the sampling point data to be deleted is equal to 1 to delete one sampling point data. A time-diversified point deleting operation is performed when the number of point(s) of the sampling point data to be deleted is greater than 1. In the time-diversified point deleting operation, the control circuit firstly performs the single point deleting operation, and then when counting of the counter expires each time, the control circuit performs the single point deleting operation until a count of performing the single point deleting operation is equal to the number of point(s) of the sampling point data to be deleted.

In the method for synchronously accessing the audio data and the audio playback system using the same according to the preferred embodiments of the present invention, a read address of the second device corresponds to a specific indicator, and the control circuit performs a normalizing process according to the read address of the second device to move the specific indicator when the control circuit performs the interpolation operation.

In the method for synchronously accessing the audio data and the audio playback system using the same according to the preferred embodiments of the present invention, the audio common memory has a length, the length is represented as L, and the predetermined difference is L/2. In a preferred embodiment of the present invention, the predetermined difference has a specific range. The control circuit judges whether the difference between the read address value of the second device and the write address value of the first device falls within the specific range, and the control circuit performs the interpolation operation when the difference between the read address value of the second device and the write address value of the first device does not fall within the specific range.

In the method for synchronously accessing the audio data and the audio playback system using the same according to the preferred embodiments of the present invention, the first device is connected to the second device through a transmission interface, the second device writes the audio data into the audio common memory through the transmission interface, and the transmission interface is a universal serial bus (USB).

The essence of the present invention is to detect the difference between the read address and the write address to perform the point interpolating or point deleting operation of the sampling data. Thus, the present invention can adaptively adjust the read and write speeds of the two host devices, and also compensate for the process errors of the quartz oscillators of two hosts at the same time, so that the audio data can be immediately and smoothly played back.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

At present, the smart phone becomes popularized, and many electronic devices need to jump off the old use, thereby inducing new technology coordinating with the smart phone. Taking a vehicle sounder as an example, not only the playback of the memory card or the audio data on the optical disk is needed, but also the connection with the smart phone is required to directly playback the audio data transmitted from the smart phone.

In general, when the host (e.g. the smart phone) transmitting the audio data and the host (e.g., the automobile head unit) playing back the audio data have different oscillator frequencies, the sampling frequency mismatch occurs between the receiving and transmitting end, so that the sound off or delay occurs when the automobile head unit is playing back the audio data. In the condition where the computation amount and the memory are limited, the present invention proposes a method for synchronously accessing the audio data and an audio playback system using the same to solve the problem of the sampling frequency mismatch.

Figure 1:
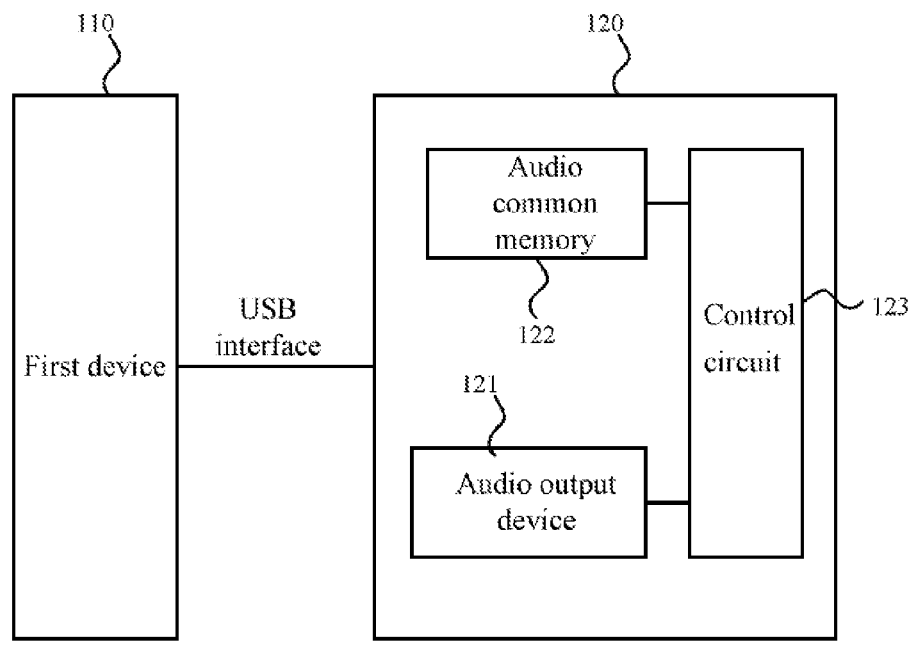
FIG. 1 is a block diagram showing an audio playback system according to a preferred embodiment of the present invention.

FIG. 1 is a block diagram showing an audio playback system according to a preferred embodiment of the present invention. Referring to FIG. 1, the audio playback system comprises a first device 110 and a second device 120. For the sake of the following description of this embodiment, the first device 110 is assumed to be the host transmitting the audio data, and the second device 120 is assumed to be the host playing back the audio data. The second device 120 comprises an audio output device 121, an audio memory 122 and a control circuit 123. For example, the USB is connected between the first device 110 and the second device 120, so that the audio data outputted by the first device 110 is written into the audio memory 122 by way of streaming. After the control circuit 123 of the second device reads out the audio data inside the audio memory 122, the control circuit 123 of the second device controls the audio output device 121 to broadcast this audio data. The audio output device 121 is, for example, a speaker, an earphone or the like. Although the USB is connected between the first device 110 and the second device 120 in this embodiment, those skilled in the art should know that the first device 110 and the second device 120 may transmit data through wired or wireless transmission interface, such as a wireless network (e.g., Wi-Fi), bluetooth or the like.

Figure 2:
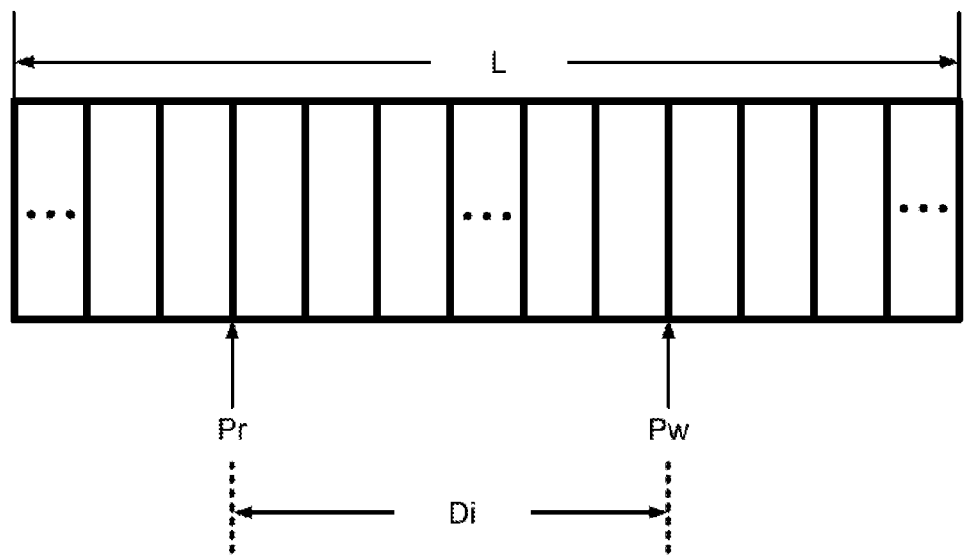
FIG. 2 is a schematic block diagram showing an audio common memory according to a preferred embodiment of the present invention.

FIG. 2 is a schematic block diagram showing an audio common memory according to a preferred embodiment of the present invention. Referring to FIG. 2, the audio memory 122 has a fixed length L, for example, wherein Pw denotes the written address of the audio memory 122 written by the first device 110 at this time, and Pr denotes the read address of the audio memory 122 read by the second device 120 at this time. At an initial state, a predetermined initial difference Di between the write address Pw and the read address Pr is present (that is, an address to address distance between the write address PW and the read address Pr is present). If no sampling frequency mismatch is present, the predetermined initial difference Di between the write address Pw and the read address Pr may be always kept, and the second device 120 may immediately and smoothly play back the read-out audio data.

In the condition where the sampling frequency mismatch is present, if the speed of the second device 120 of reading out the audio memory 122 is greater than the speed of the first device 110 of writing the audio memory 122, then after playing back a period of time, the read address Pr exceeds the write address Pw so that the second device 120 reads the audio data, which is not updated, to cause the discontinuous playback of the second device 120. In addition, in the condition where the sampling frequency mismatch is present, if the speed of the first device 110 of writing the audio memory 122 is greater than the speed of the second device 120 of reading out the audio memory 122, then after playing back a period of time, the read address Pr lags behind the write address Pw to much, so that the first device 110 covers the audio data of the audio memory 122, which has not yet been read by the second device 120, to cause the discontinuous playback of the second device 120.

In this embodiment, the control circuit 123 detects whether the difference between the read address Pr and the write address Pw is different from a predetermined difference Dth. When the difference between the read address Pr and the write address Pw is different from the predetermined difference Dth, the control circuit 123 performs an interpolation operation to compensate for the insufficient or excess sampling points. The above-mentioned interpolation operation is a point interpolating operation or a point deleting operation, for example. For example, if the read speed of the second device 120 lags behind the write speed of the first device 110, then the control circuit 123 performs the point deleting operation. If the read speed of the second device 120 exceeds the write speed of the first device 110, then the control circuit 123 performs the point interpolating operation. In order to disable the ears of the user from hearing the audio data whose sampling is changed by the control circuit 123 according to a preferred embodiment of the present invention, the control circuit 123 does not simply add the sampling points or delete the sampling points when performing the interpolation operation, but performs a smoothening process or digital signal process having correlations, such as the digital filter calculation, on the audio data neighboring the address of the sampling point where the point interpolating or point deleting is to be performed.

In addition, after the control circuit 123 executes the point interpolating operation, the read address Pr is normalized so that the difference D between the read address Pr and the write address Pw more approaches the predetermined difference Dth. In other words, when the control circuit 123 performs the point interpolating operation, the indicator of the read address Pr moves backwards. On the contrary, when the control circuit 123 performs the point deleting operation, the indicator of the read address Pr moves frontwards.

This embodiment detects the difference between the read address and the write address to perform the point interpolating or point deleting operation of the sampling data. Thus, the present invention can adaptively adjust the read and write speeds of the two host devices, as well as compensate for the process errors of the quartz oscillators of the two hosts.

Figure 3A:
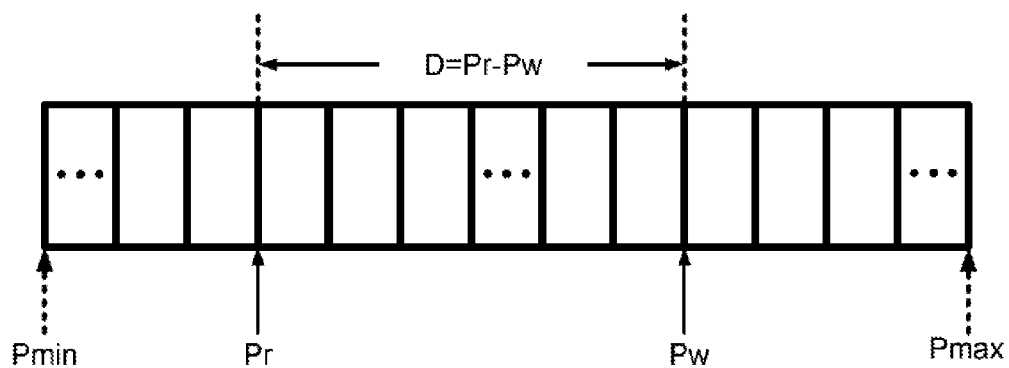
FIG. 3A is a schematic view showing a method for computing an address to address distance according to a preferred embodiment of the present invention.
Figure 3B:
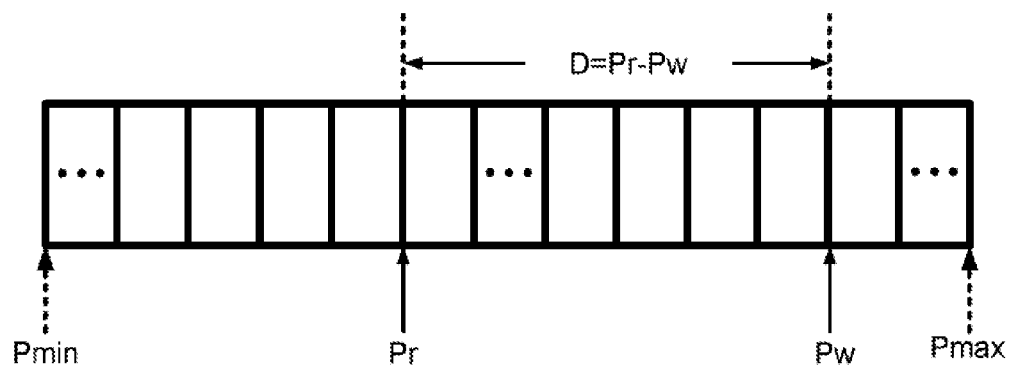
FIG. 3B is a schematic view showing a method for computing an address to address distance according to a preferred embodiment of the present invention.
Figure 3C:
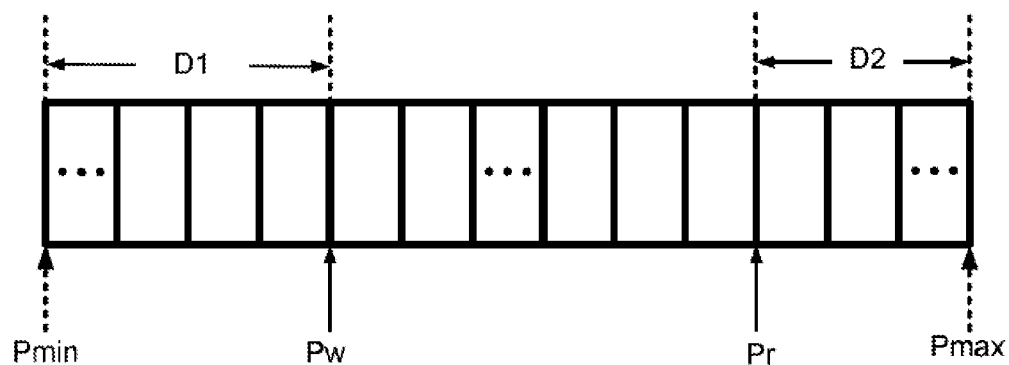
FIG. 3C is a schematic view showing a method for computing an address to address distance according to a preferred embodiment of the present invention.

The above-mentioned detects the difference between the read address Pr and the write address Pw by way of, for example, calculating the address to address distance. In order to make those skilled in the art be able to implement the present invention through this embodiment, the method of calculating the address to address distance will be described in the following. FIGS. 3A to 3C are schematic views showing a method for computing an address to address distance according to a preferred embodiment of the present invention, respectively. For the sake of the following illustration, the initial address of the audio memory 122 is assumed to be Pmin, and the ending address is assumed to be Pmax. Please refer to FIG. 3A, at the beginning, the difference between the read address Pr and the write address Pw (represented as D in the following) has been configured as a predetermined value Di, in other words, D=PwPr=Di. Next, referring to FIG. 3B, after the audio memory 122 is read and written for a period of time, the read address Pr and the write address Pw move frontwards, and their difference D=Pw−Pr. Referring to FIG. 3C, after the audio memory 122 is continuously read and written for a period of time and the write address Pw moves frontwards and past the address Pmax and returns to the initial address Pmin, the difference D between the read address Pr and the write address Pw= (Pw−Pmin)+(Pmax−Pr)=D1+D2.

In this embodiment, the above-mentioned predetermined difference Dth is, for example, a constant value, which may be determined according to the hardware parameter or application of the system the present invention and the value of the predetermined difference Dth is not restricted. For example, the predetermined difference Dth is designed to be, for example, a half of the length L of the audio memory 122, that is, Dth=L/2. The advantages of designing Dth=L/2 resides in that the method of calculating the above-mentioned difference D can be simplified, the difference D between the read address Pr and the write address Pw is |Pr−Pw|, | | wherein denotes the absolute value.

In the above-mentioned embodiment, the predetermined difference Dth is a constant value as an example. However, those skilled in the art can infer that the predetermined difference Dth may also be falls within a specific range. When the difference D between the read address Pr and the write address Pw falls within the specific range, the control circuit 123 does not perform the point interpolating or point deleting operation. On the contrary, if the difference D between the read address Pr and the write address Pw exceeds the specific range, then the point interpolating or point deleting operation starts.

In order to make those skilled in the art be able to implement the present invention through this embodiment, the interpolation operation method of this embodiment will be described in the following. For the sake of the following illustration this embodiment, it is firstly assumed that the control circuit 123 detects that the difference D between the read address Pr and the write address Pw is smaller than the above-mentioned predetermined difference Dth, and the difference between the difference D and the predetermined value Dth exceeds the distance of one sampling data. This condition denotes that the read speed exceeds the write speed, and the control circuit 123 judges that the point interpolating operation needs to be performed at this time to interpolate one sampling point data. In order to prevent the user from hearing the audio with the pop noise or sound off, the point interpolating operation of this embodiment adopts the smoothening process technology, and changes the sampling point data neighboring the point interpolating data address.

Figure 4:
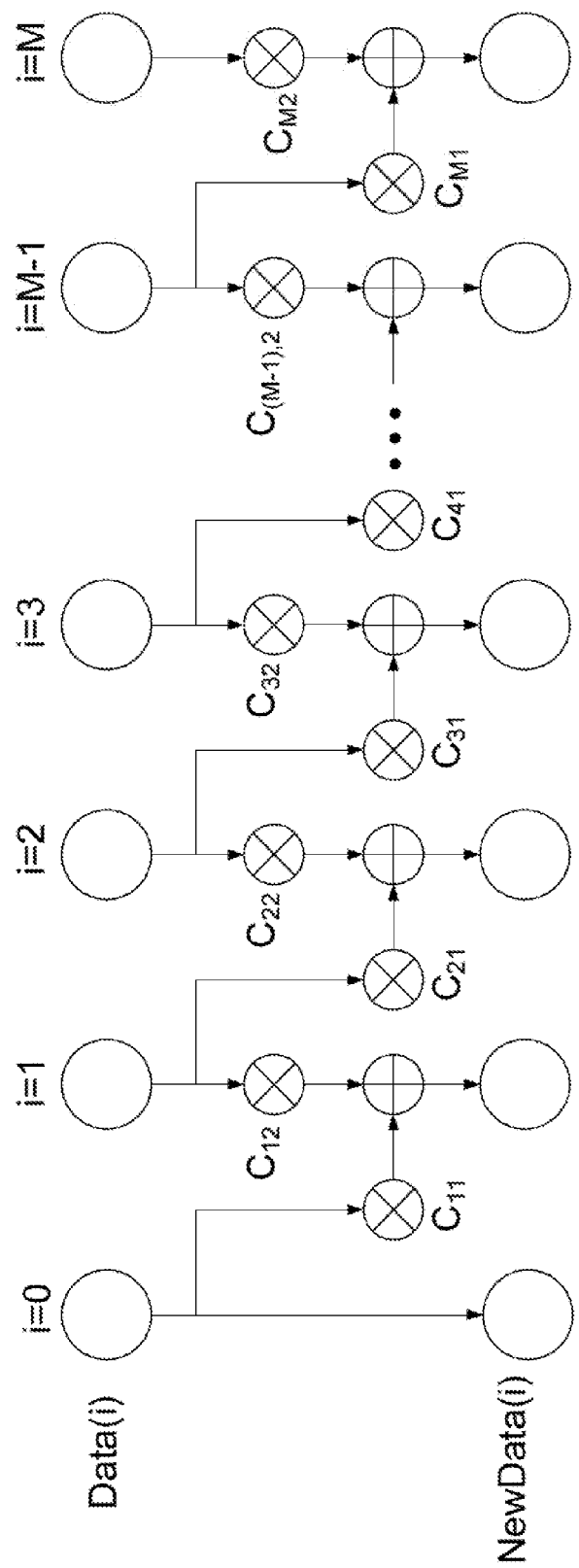
FIG. 4 is a schematic view showing a point interpolating operation according to a preferred embodiment of the present invention.

FIG. 4 is a schematic view showing a point interpolating operation according to a preferred embodiment of the present invention. Referring to FIG. 4, the original data are represented as Data[t], for example, where "t" denotes time index, the data after the point interpolating operation are represented as NewDate[t]. This embodiment is assumed to interpolate one sampling point data in M points of original data. In other words, the length of the original data Data[t] is M, and the length of the new data NewDate[t] after the point interpolating operation is (M+1). In this embodiment, the new data after the point interpolating operation are associated with the data of the previous sampling time point, for example, wherein the new data are represented as NewDate[i]=$C_{i,1}$×Data[i−1]+$C_{i,2}$×Data[i], where i=1, 2, 3, . . . M, NewDate[0]=Date[0], for example.

After the point interpolating operation is performed, the control circuit 123 normalizes the read address Pr, and moves the read address Pr in the audio memory 122, so that the difference D between the read address Pr and the write address Pw returns to the allowable range. In the above-mentioned example, the read speed exceeds the write speed, the difference D between the read address Pr and the write address Pw is greater than the predetermined difference Dth by the distance of one sampling data. Thus, after the point interpolating operation is performed, the control circuit 123 moves the read address Pr backwards by one address.

Figure 5:
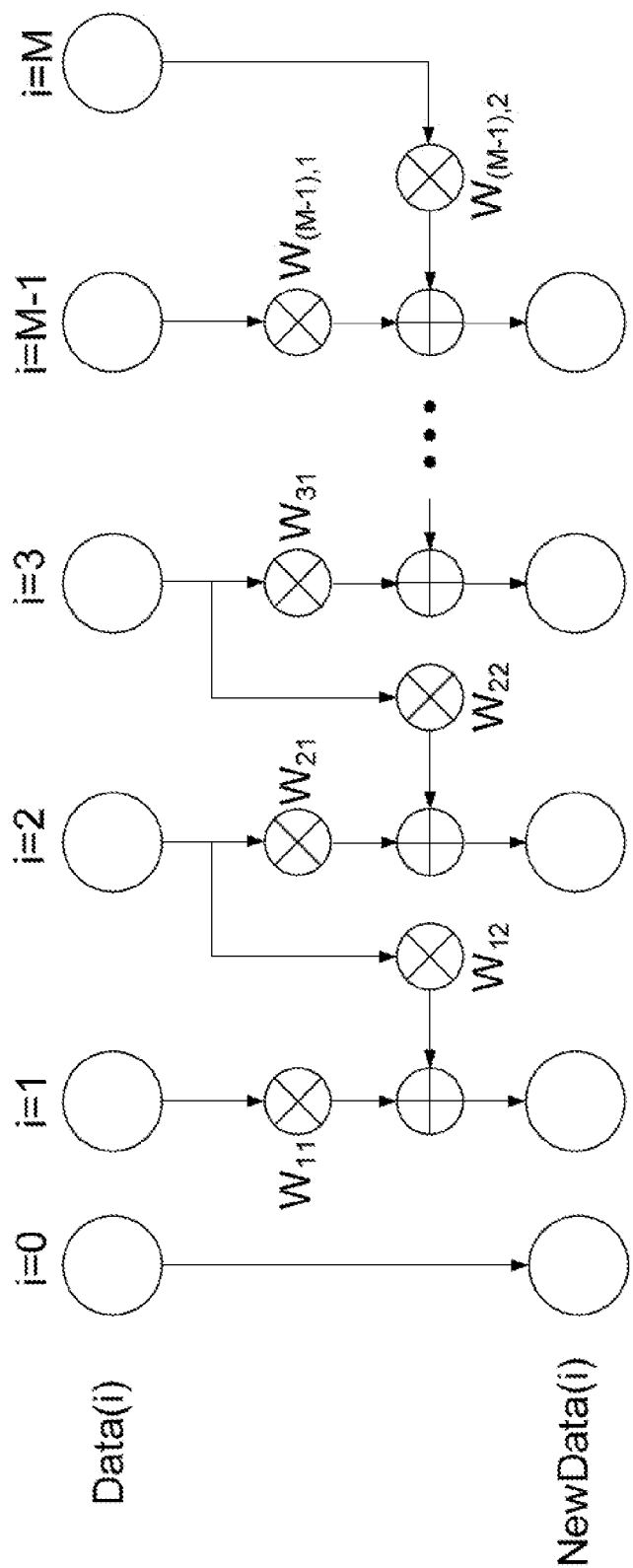
FIG. 5 is a schematic view showing a point deleting operation according to a preferred embodiment of the present invention.

Next, in order to describe the interpolation operation of this embodiment, it is assumed that when the control circuit 123 detects that the difference D between the read address Pr and the write address Pw is greater than the above-mentioned predetermined difference Dth, and the difference between the difference D and the predetermined value Dth exceeds the distance of one sampling data. This case denotes that read speed cannot catch up with the write speed, and that the control circuit 123 judges that the point deleting operation needs to be performed at this time to delete one sampling point data. FIG. 5 is a schematic view showing a point deleting operation according to a preferred embodiment of the present invention. Referring to FIG. 5, for example, the original data are similarly represented as Data[t], and the data after the point deleting operation are represented as NewDate[t]. This embodiment is assumed to delete one sampling point data from (M+1) points of original data. In other words, the length of the original data Data[t] is (M+1), and the length of the new data NewDate[t] after the point deleting operation is M. In this embodiment, the new data after the point deleting operation are associated with the data of one following sampling time point, for example, wherein the new data are represented as NewDate[i]=$W_{i,1}$×Data[i]+$W_{i,2}$×Data[i+1], i=1, 2, 3, . . . M, NewDate[0]=Date[0], for example.

After performing the point deleting operation, the control circuit 123 normalizes the read address Pr, and moves the read address Pr in the audio memory 122, so that the difference D between the read address Pr and the write address Pw returns to the allowable range. In the above-mentioned example, the read speed is smaller than the write speed, and the difference D between the read address Pr and the write address Pw is greater than the predetermined difference Dth by the distance of one sampling data. Thus, after performing the point deleting operation, the control circuit 123 moves the read address Pr frontwards by one address.

The read address Pr and the write address Pw of the above-mentioned audio memory 122 may be, for example, the position of the real memory, may also be the virtual address upon software operation, and the present invention does not restrict the address recording pattern. In addition, the above-mentioned read address Pr and write address Pw are, for example, two indicators for recording the read address Pr and the write address Pw, respectively. After the above-mentioned interpolation operation, the control circuit 123 moves the indicator corresponding to the read address Pr to adjust the difference D between the read address Pr and the write address Pw.

According to the above-mentioned descriptions regarding to FIGS. 4 and 5, when the embodiment of the present invention performs the point interpolating operation and the point deleting operation, the neighboring data, according to which the point deleting and point interpolating are to be performed are also incorporated and calculated, so that the audio data after the point interpolating or point deleting operation can keep the smoothness of the audio signal, and the user always hear the smooth audio.

In the above-mentioned interpolation operation, multiple parameters $C_{i,1}$, $C_{i,2}$, $W_{i,1}$ and $W_{i,2}$ are used, wherein the parameters are, for example, the weighting coefficients upon calculation of the new data NewDate[t]. The values of the multiple weighting coefficients are designed in advance by the circuit designer, for example, stored in the system, and can be directly used upon calculation of the new data NewDate[t]. Alternatively, after this system is turned on, the above-mentioned weighting coefficients are adaptively generated according to the property of the audio data or the system parameter. Thus, the present invention does not restrict the time for generating the weighting coefficients. In addition, the values of the weighting coefficients $C_{i,1}$, $C_{i,2}$, $W_{i,1}$ and $W_{i,2}$ may be generated through the algorithm in the prior art equalizer, digital filter or the like. So, the present invention does not restrict the calculating method of the weighting coefficient.

In the above-mentioned embodiment, the new data NewDate[t] after the point interpolating operation and the point deleting operation relates to the previous sampling time data or the following sampling time data, for example. However, those skilled in the art should know that the point interpolating operation and the point deleting operation do not restrict data points to be operated, and the new data NewDate[t] may relate to the previous and following data concurrently, for example, or may relate to the data of the previous N sampling times or the following N sampling data, wherein N is a positive integer.

In the above-mentioned embodiment, all the new data NewDate[t] in the point interpolating operation and the point deleting operation are generated using a linear equation. However, those skilled in the art should know that the present invention does not restrict the mathematical expression of the point interpolating operation and the point deleting operation. Any technology correlated with the digital signal process may be applied to the present invention.

In the examples of the above-mentioned point interpolating operation and point deleting operation, the distance of one sampling point is described. However, those skilled in the art should know that, when the control circuit 123 detects that the difference D between the read address Pr and the write address Pw is too large, the present invention may also perform the point interpolating operation or point deleting operation for multiple points at a time. That is, multiple sampling point data are added in a point interpolating operation, and multiple sampling point data are deleted in a point deleting operation.

In addition, if multiple points of data are interpolated or deleted at the same tine, the audio signal being played back may have the problem, such as sound off, audio delay or the like, to make the user hear the unpleasant audio. Thus, in a preferred embodiment of the present invention, the control circuit 123 further comprises a counter for making the above-mentioned point interpolating or point deleting operations be uniformly distributed over different times.

For example, when the control circuit 123 detects that the difference D between the read address Pr and the write address Pw is smaller the above-mentioned predetermined difference Dth, and the control circuit 123 judges that three sampling point data need to be interpolated through the point interpolating operation, the control circuit 123 firstly performs the point interpolating operation to interpolate one sampling point data. The method of the point interpolating operation is the method mentioned in FIG. 4, and will not be described in detail herein. Next, the counter within the control circuit 123 starts counting. After the counter counts to a predetermined time, the control circuit 123 further performs the point interpolating operation of FIG. 4 to interpolate one sampling point data. Next, the counter of the control circuit 123 also starts re-counting to the above-mentioned predetermined time. When the counting expires, the control circuit 123 again performs the point interpolating operation of the above-mentioned FIG. 4 to interpolate the last one sampling point data.

According to the above-mentioned description, it is obtained that the control circuit 123 performs a time-diversified point interpolating operation. When the counting expires, the point interpolating operation is again started, and each point interpolating operation only interpolates one sampling point data. Thus, this embodiment uniformly distributes the times of interpolating the sampling point data in a time-diversified manner, so that the human ears cannot hear that the audio data are changed.

On the contrary, when the control circuit 123 detects that the difference D between the read address Pr and the write address Pw is greater than the above-mentioned predetermined difference Dth, and the control circuit 123 judges that three sampling point data need to be deleted through the point deleting operation, the control circuit 123 firstly performs the point deleting operation to delete one sampling point data. The method of the point deleting operation is the method mentioned in FIG. 5, and will not be described in detail herein. Next, the counter within the control circuit 123 starts counting. After the counter counts to a predetermined time, the control circuit 123 again performs the point deleting operation of FIG. 5 to delete one sampling point data. Next, the counter of the control circuit 123 also starts re-counting to the above-mentioned predetermined time. When the counting expires, the control circuit 123 again performs the above-mentioned point deleting operation of FIG. 5 to delete the last one sampling point data.

According to the above-mentioned descriptions, it is obtained that the control circuit 123 performs a time-diversified point deleting operation. When the counting expires, the point deleting operation again starts, and each point deleting operation only deletes one sampling point data. Thus, this embodiment uniformly distributes the times of deleting the sampling point data in a time-diversified manner, so that the human ears cannot hear that the audio data are changed.

The above-mentioned control circuit 123 uses the counter to uniformly perform the point interpolating operation and the point deleting operation, wherein a time interval between the operations is a predetermined time, which may be determines by the frequency offset of the oscillator detected by the control circuit 123, or may be determined according to other system parameters. In addition, the counter within the control circuit 123 may be used to count to a predetermined time, may also be used to count the number of times of reading the data from the audio memory 122, or may be another clock in the system. Thus, the present invention does not restrict the application of the counter.

Figure 6:
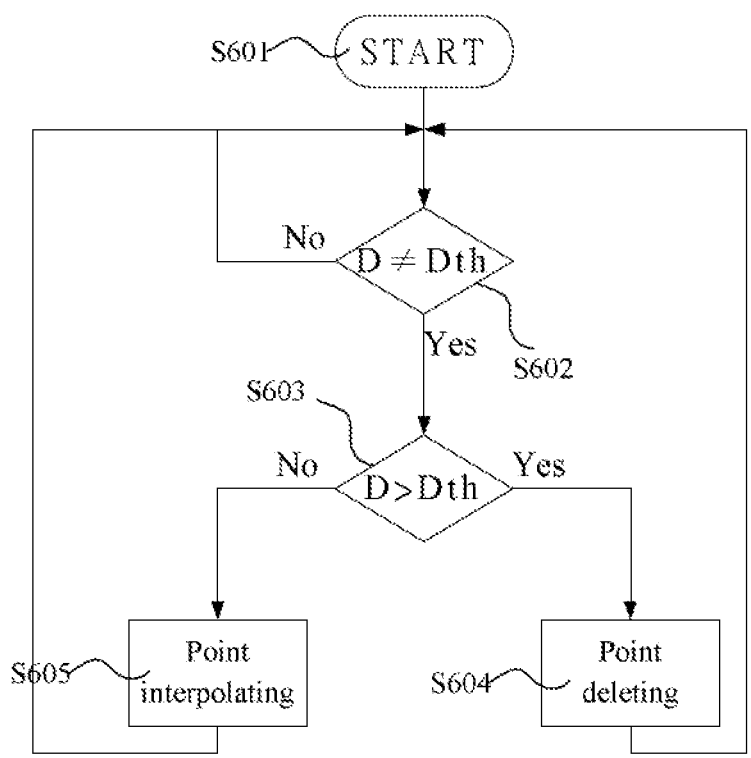
FIG. 6 is a flow chart showing a method for synchronously accessing an audio data according to a preferred embodiment of the present invention.

According to the description of the above-mentioned audio playback system, this embodiment can be generalized as a method for synchronously accessing audio data. FIG. 6 is a flow chart showing a method for synchronously accessing an audio data according to a preferred embodiment of the present invention. Referring to FIGS. 1 and 6, the first device 110 transmits the audio data to the audio memory 122 of the second device 120. Each of the steps of the method for synchronously accessing the audio data according to this embodiment will be described in the following.

In step S601, a method for synchronously accessing audio data starts.

In step S602, it is judged whether the difference D between the read address Pr and the write address Pw is different from the predetermined difference Dth. If the judged result is affirmative (Yes), then step S602 is executed. If the judged result is negative (No), then the method returns to the step S602. It is obtained, from the above-mentioned embodiment, that the control circuit 123 detects the difference D between the read address Pr and the write address Pw according to the calculating method shown in FIG. 3.

In step S603, it is judged whether the difference D between the read address Pr and the write address Pw is greater than the predetermined difference Dth. If the judged result is affirmative (Yes), then step S604 is executed. If the judged result is negative (No), then step S605 is executed. It is obtained, from the above-mentioned embodiment, that the condition when the difference D is greater than Dth denotes that the read speed cannot catch up with the write speed, and the control circuit 123 performs the point deleting operation. On the contrary, the condition when the difference D is smaller than Dth denotes that the read speed exceeds the write speed, and the control circuit 123 performs the point interpolating operation.

In step S604, the point deleting operation is performed according to the method shown in FIG. 5. After the data is deleted, the read address Pr is normalized.

In step S605, the point interpolating operation is performed according to the method shown in FIG. 4. After the data are interpolated, the read address Pr is normalized.

After the control circuit 123 executes the point deleting operation of the step S604 or the point interpolating operation of the step S605, the method returns to the step S602 to continue detecting whether the read speed and write speed of the audio data are synchronized with each other.

Figure 7:
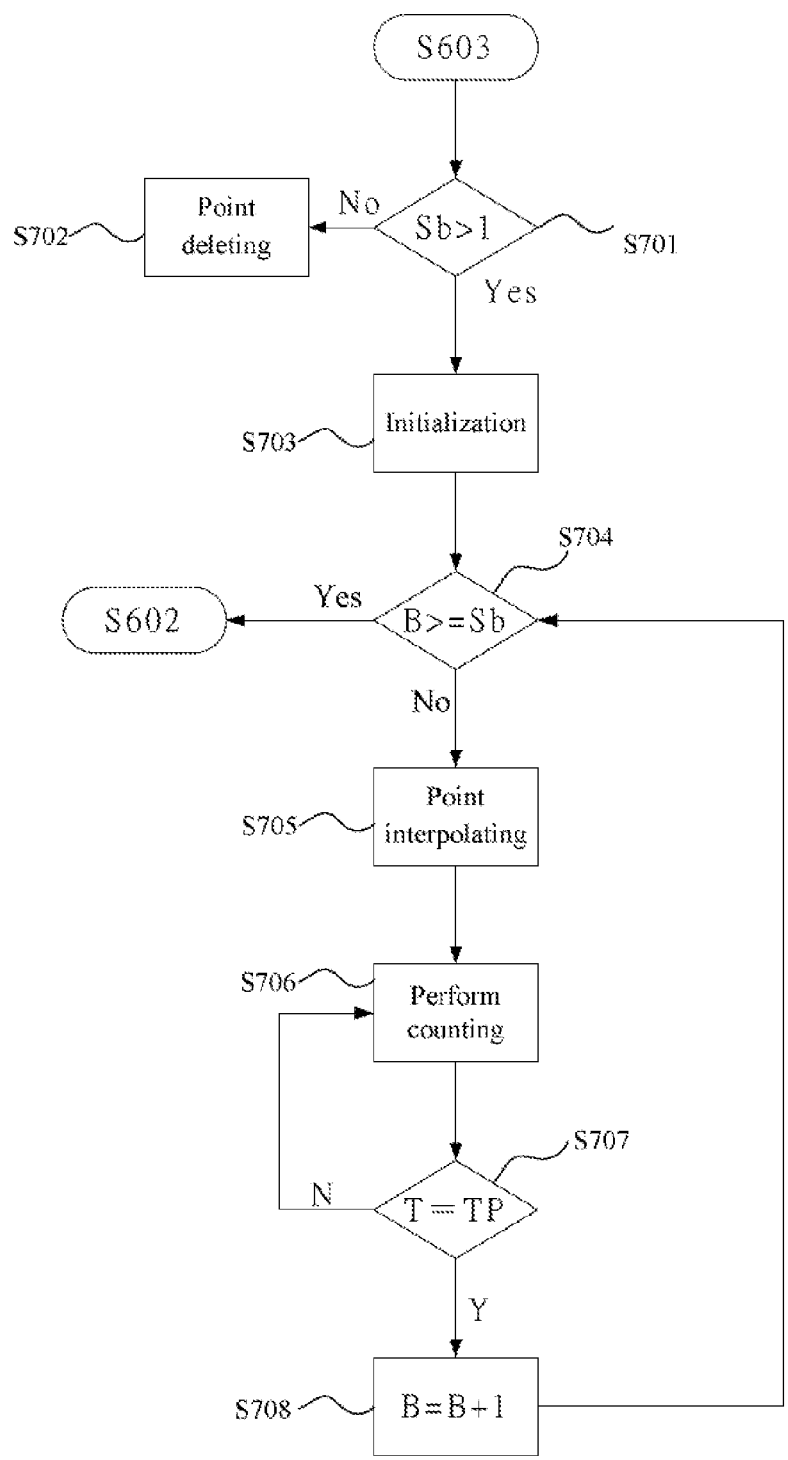
FIG. 7 is a flow chart showing detailed steps of step S604 according to a preferred embodiment of the present invention.

In another embodiment of the present invention, in order to prevent the control circuit 123 from continuously performing the point interpolating or point deleting, the counting mechanism is added so that the control circuit 123 uniformly distributes the timings of the point interpolating or point deleting operations. The detailed implementation steps of the step S604 is shown in FIG. 7. FIG. 7 is a flow chart showing detailed steps of step S604 according to a preferred embodiment of the present invention. Referring to FIG. 7, when the judged result of the step S603 is affirmative, step S701 is performed.

In step S701, it is judged whether the number of to-be-deleted point(s) Sb is greater than one. As described in the above-mentioned embodiment, the control circuit 123 determines how many sampling point data are to be deleted in this point deleting operation according to the difference between the above-mentioned difference D and the predetermined difference Dth. For the sake of illustration of this embodiment, the total number of to-be-deleted sampling point data is represented as Sb. If Sb is equal to 1, then step S702 is executed. If Sb is greater than 1, then step S703 is executed.

In step S702, the point deleting operation is performed according to a single point deleting operation shown in FIG. 4 to delete one sampling point data, and the read address Pr is normalized. After the step S702 is executed, and the process returns to the step S602.

In step S703, an initial value of a point deleting variable B is set. In this embodiment, the initial value of the point deleting variable B is 0.

In step S704, it is judged whether the point deleting variable B is equal to the total number Sb of the above-mentioned point deleting data. If the judged result is negative (No), then step S705 is continued to perform the point deleting operation. If the judged result is affirmative (Yes), then it represents that all points have been deleted, and the process returns to the step S602.

In step S705, the point deleting operation is performed. The control circuit 123 performs the point deleting operation to delete one sampling point data, and the read address Pr is normalized.

In step S706, the counter starts counting.

In step S707, it is judged whether the counter counts to the predetermined time TP. If the judged result is affirmative (Yes), then the step S708 is executed. If the judged result is negative (No), then the method returns to the step S707.

In step S708, the point deleting variable B=B+1 is set, and the timer is reset. In other words, the point deleting variable B is increased by 1. The method returns to step S704 to continue judging.

Figure 8:
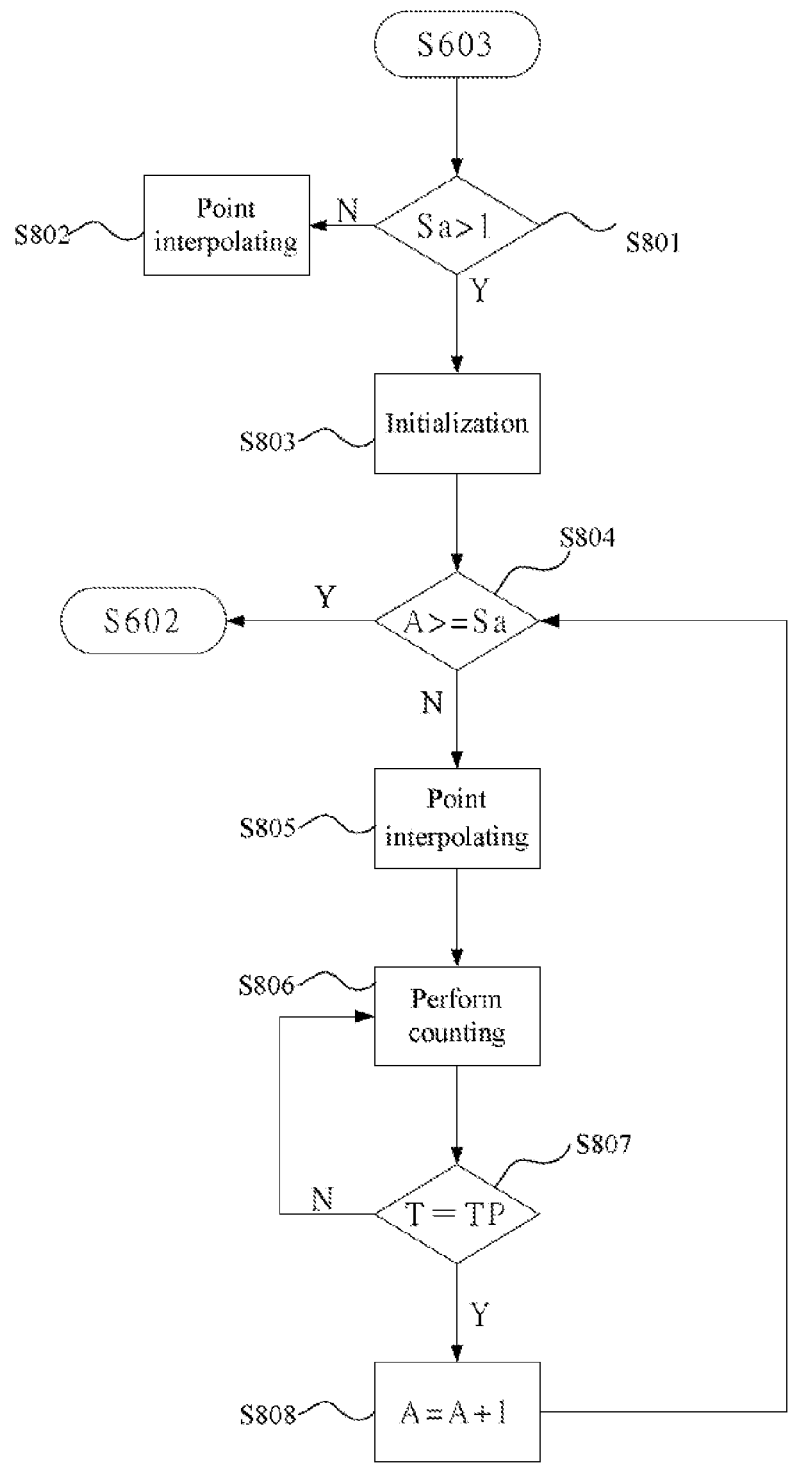
FIG. 8 is a flow chart showing detailed steps of step S605 according to a preferred embodiment of the present invention.

Similarly, the detailed implementation steps of the above-mentioned point interpolating step S605 is shown in FIG. 8. FIG. 8 is a flow chart showing detailed steps of step S605 according to a preferred embodiment of the present invention. Referring to FIG. 8, when the judged result of the step S603 is negative (No), then the step S801 is executed.

In step S801, it is judged whether the number of to-be-interpolated point(s) Sa is greater than one. As described in the above-mentioned embodiment, the control circuit 123 determines how many sampling point data are to be interpolated in this point interpolating operation according to the difference between the above-mentioned difference D and the predetermined difference Dth. For the sake of illustration of this embodiment, the total number of to-be-interpolated sampling point data is represented as Sa. If Sa is equal to 1, then step S802 is executed. If Sa is greater than 1, then step S803 is executed.

In step S802, the point interpolating operation is performed according go the single point interpolating operation shown in FIG. 4 to interpolate one sampling point data, and the read address Pr is normalized. After the step S802 is executed, the process returns to the step S602.

In step S803, an initial value of a point interpolating variable A is set. In this embodiment, the initial value of the point interpolating variable A is 0.

In step S804, it is judged whether the point interpolating variable A is equal to the total number Sa of the above-mentioned point interpolating data. If the judged result is negative (No), then step S805 is continued to perform the point interpolating operation. If the judged result is affirmative (Yes), then it represents that all the points have been interpolated, and the process returns to the step S602.

In step S805, the point interpolating operation is performed. The control circuit 123 performs the point interpolating operation to interpolate one sampling point data, and the read address Pr is normalized.

In step S806, the counter starts counting.

In step S807, it is judged whether the counter counts to the predetermined time TP. If the judged result is affirmative (Yes), then step S808 is executed. If the judged result is negative (No), then the method returns to step S807.

In step S808, the point interpolating variable A=A+1 is set, and the timer is reset. In other words, the point interpolating variable A is increased by 1. The method returns to step S804 to continue judging.

In summary, it is obtained that the present invention has the following advantages according to the descriptions of the embodiments of the present invention.

1. This embodiment detects the difference between the read address and the write address to perform the point interpolating or point deleting operation of the sampling data. Thus, the present invention can adaptively adjust the read and write speeds of the two host devices, and compensate for the process errors of the quartz oscillators of the two hosts, so that the audio data can be played back immediately and smoothly.

2. When the embodiment of the present invention performs the point interpolating operation and point deleting operation, the data neighboring the addresses, where the point deleting and point interpolating are to be performed, are also incorporated and calculated, so that the audio data after the point interpolating or point deleting operation can keep the smoothness of the audio signal, and the user always hear the smooth audio without any pop noise or delayed playback problem.

3. The point interpolating operation and point deleting operation of the embodiment of the present invention only use the adder and the multiplier, and needs not to perform up-sampling and down-sampling on the signal in a manner similar to the prior art. Thus, the present invention can immediately compensate for the frequency offset of the oscillator without adding the computation amount.

4. In addition, the embodiment of the present invention further utilizes the time-diversified concept. The point interpolating or point deleting operation cannot be performed until a period of time interval has elapsed. In addition, only one sampling point data is deleted in each point deleting operation. Thus, the hearing sense of the user cannot distinguish between the differences of the audio data, so that the human ears cannot hear that the audio data are changed.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A method for synchronously accessing an audio data, comprising:
providing a first device and a second device;
providing an audio memory in the second device;
transmitting the audio data from the first device to the second device when the second device performs an audio playback;
writing the audio memory by the first device and reading the audio memory by the second device when the first device transmits the audio data to the second device; and
performing an interpolation operation by the second device when a difference between a read address value of the second device and a write address value of the first device is different from a predetermined difference;
wherein when the difference between the read address value of the second device and the write address value of the first device is different from the predetermined difference, the second device performs the interpolation operation comprising:
judging whether the difference between the read address value of the second device and the write address value of the first device is greater than the predetermined difference;
performing a point deleting operation when the difference between the read address value of the second device and the write address value of the first device is greater than the predetermined difference; and
performing a point interpolating operation when the difference between the read address value of the second device and the write address value of the first device is smaller than the predetermined difference;
wherein the audio data comprises multiple sampling point data, and the point interpolating operation comprises the steps of:
determining a specific sampling point data to perform the point interpolating operation in the sampling point data; and
performing a digital filter computation according to neighboring M sampling point data of the specific sampling point data, and generating (M+1) new sampling point data,
where M is a natural number.

2. The method according to claim 1, wherein the sampling point data are represented as Data[i], and the new sampling point data are represented as NewDate[i], where
NewDate[i]=$C_{i,1}$×Data[i−1]+$C_{i,2}$×Data[i], and
NewDate[0]=Date[0],
where "i" denotes a time index, "i" is a positive integer ranging from 1 to M, $C_{i,1}$ and $C_{i,2}$ denote weighting coefficients, and $C_{i,1}$ and $C_{i,2}$ are real numbers.

3. The method according to claim 1, wherein the point interpolating operation comprises the steps of:
determining the number of point(s) of the sampling point data to be interpolated in the point interpolating operation according to the difference between the read address value of the second device and the write address value of the first device;
performing a single point interpolating operation to interpolate one sampling point data when the number of point(s) of the sampling point data to be interpolated is equal to 1; and
performing a time-diversified point interpolating operation when the number of point(s) of the sampling point data to be interpolated is greater than 1;
wherein the time-diversified point interpolating operation comprises:
a step (a) of setting an initial value of a point interpolating variable;
a step (b) of judging whether the point interpolating variable is equal to the number of point(s) of the sampling point data to be interpolated;
a step (c) of performing the single point interpolating operation when a judged result of the step (b) is negative, and ending the time-diversified point interpolating operation when the judged result of the step (b) is affirmative;
a step (d) of starting a timer to count; and
a step (e) of setting the point interpolating variable to increase by 1 and resetting the counter and then returning to the step (b) when the timer counts to a predetermined time.

4. The method according to claim 1, wherein the audio data comprises multiple sampling point data, and the point deleting operation comprises:
determining a specific sampling point data to perform the point deleting operation in the sampling point data; and performing a digital filter computation according to neighboring (M+1) sampling point data of the specific sampling point data, and generating M new sampling point data, where M is a natural number.

5. The method according to claim 4, wherein the sampling point data are represented as Data[i], and the new sampling point data are represented as NewDate[i], where NewDate[i]=$W_{i,1}$×Data[i]+$W_{i,2}$×Data[i+1], and
NewDate[0]=Date[0], where "i" denotes a time index, "i" is a positive integer ranging from 1 to M, $W_{i,1}$ and $W_{i,2}$ denote weighting coefficients, and $W_{i,1}$ and $W_{i,2}$ are real numbers.

6. The method according to claim 1, wherein the point deleting operation comprises the steps of:

determining the number of point(s) of the sampling point data to be deleted in the point deleting operation according to the difference between the read address value of the second device and the write address value of the first device;

performing a single point deleting operation when the number of point(s) of the sampling point data to be deleted is equal to 1 to delete one sampling point data; and performing a time-diversified point deleting operation when the number of point(s) of the sampling point data to be deleted is greater than 1;

wherein the time-diversified point deleting operation comprises:

a step (a) of setting an initial value of a point deleting variable;

a step (b) of judging whether the point deleting variable is equal to the number of point(s) of the sampling point data to be deleted;

a step (c) of performing the single point deleting operation when a judged result of the step (b) is negative, and ending the time-diversified point deleting operation when the judged result of the step (b) is affirmative;

a step (d) of starting a timer to count; and a step (e) of setting the point deleting variable to increase by 1 and resetting the counter, and then returning to the step (b) when the timer counts to a predetermined time.

7. The method according to claim 1, wherein a read address of the second device corresponds to a specific indicator, and the step of the interpolation operation further comprises:

performing a normalizing process according to the read address of the second device to move the specific indicator.

8. The method according to claim 1, wherein the audio memory has a length, the length is represented as L, and the predetermined difference is L/2.

9. The method according to claim 1, wherein the predetermined difference has a specific range, wherein when the difference between the read address value of the second device and the write address value of the first device is different from the predetermined difference, the second device performs the interpolation operation comprising the steps of:

judging whether the difference between the read address value of the second device and the write address value of the first device falls within the specific range; and performing the interpolation operation by the second device when the difference between the read address value of the second device and the write address value of the first device does not fall within the specific range.

10. The method according to claim 1, wherein the first device is connected to the second device through a transmission interface, and the first device writes the audio data into the audio memory through the transmission interface, wherein the transmission interface is a universal serial bus (USB).

11. An audio playback system, comprising:

a first device;

a second device electrically connected to the first device through an interface, wherein the second device comprises:

an audio output device;

an audio memory, wherein when the second device performs an audio playback, the first device transmits an audio data through the interface to the audio memory of the second device; and a control circuit coupled to the audio memory and the audio output device;

wherein when the first device transmits the audio data to the second device, the first device writes the audio memory, the control circuit of the second device reads the audio memory and performs a playback through the audio output device;

wherein when a difference between a read address value of the second device and a write address value of the first device is different from a predetermined difference, the control circuit of the second device performs an interpolation operation;

wherein the control circuit judges whether the difference between the read address value of the second device and the write address value of the first device is greater than the predetermined difference, a point deleting operation is performed when the difference between the read address value of the second device and the write address value of the first device is greater than the predetermined difference, and a point interpolating operation is performed when the difference between the read address value of the second device and the write address value of the first device is smaller than the predetermined difference;

wherein the audio data comprises multiple sampling point data, the control circuit determines a specific sampling point data from the sampling point data to perform the point interpolating operation, the control circuit performs a digital filter computation according to neighboring M sampling point data of the specific sampling point data and generates (M+1) new sampling point data, where M is a natural number.

12. The audio playback system according to claim 11, wherein the sampling point data are represented as Data[i], and the new sampling point data obtained after the point interpolating operation are represented as NewDate[i], where NewDate[i]=$C_{i,1}$×Data[i−1]+$C_{i,2}$×Data[i], and
NewDate[0]=Date[0], where "i" denotes a time index, "i" is a positive integer ranging from 1 to M, $C_{i,1}$ and $C_{i,2}$ denote weighting coefficients and $C_{i,1}$ and $C_{i,2}$ are real numbers.

13. The audio playback system according to claim 11, wherein the control circuit further comprises a counter, the control circuit determines the number of point(s) of the sampling point data to be interpolated in the point interpolating operation according to the difference between the read address value of the second device and the write address value of the first device, a single point interpolating operation is performed to interpolate one sampling point data when the number of point(s) of the sampling point data to be interpolated is equal to 1, and a time-diversified point interpolating operation is performed when the number of point(s) of the sampling point data to be interpolated is greater than 1, wherein in the time-diversified point interpolating operation, the control circuit firstly performs the single point interpolating operation, and then when counting of the counter expires each time, the control circuit performs the single point interpolating operation until a count of performing the single point interpolating operation is equal to the number of point(s) of the sampling point data to be interpolated.

14. The audio playback system according to claim 11, wherein the audio data comprises multiple sampling point data, the control circuit determines a specific sampling point data from the sampling point data to perform the point deleting operation, wherein the control circuit performs a digital filter computation according to neighboring (M+1) sampling point data of the specific sampling point data and generates M new sampling point data, where M is a natural number.

15. The audio playback system according to claim 14, wherein the sampling point data are represented as Data[i], and the new sampling point data obtained after the point deleting operation are represented as NewDate[i], where NewDate[i]=$W_{i,1}$×Data[i]+$W_{i,2}$×Data[i+1], and
NewDate[0]=Date[0], where "i" denotes a time index, "i" is a positive integer ranging from 1 to M, $W_{i,1}$ and $W_{i,2}$ denote weighting coefficients, and $W_{i,1}$ and $W_{i,2}$ are real numbers.

16. The audio playback system according to claim 11, wherein the control circuit further comprises a counter, the control circuit determines the number of point(s) of the sampling point data to be deleted in the point deleting operation according to the difference between the read address value of the second device and the write address value of the first device, a single point deleting operation is performed when the number of point(s) of the sampling point data to be deleted is equal to 1 to delete one sampling point data, and a time-diversified point deleting operation is performed when the number of point(s) of the sampling point data to be deleted is greater than 1, wherein in the time-diversified point deleting operation, the control circuit firstly performs the single point deleting operation, and then when counting of the counter expires each time, the control circuit performs the single point deleting operation until a count of performing the single point deleting operation is equal to the number of point(s) of the sampling point data to be deleted.

17. The audio playback system according to claim 11, wherein a read address of the second device corresponds to a specific indicator, and the control circuit performs a normalizing process according to the read address of the second device to move the specific indicator when the control circuit performs the interpolation operation.

18. The audio playback system according to claim 11, wherein the audio memory has a length, the length is represented as L, and the predetermined difference is L/2.

19. The audio playback system according to claim 11, wherein the predetermined difference has a specific range, wherein the control circuit judges whether the difference between the read address value of the second device and the write address value of the first device falls within the specific range, and the control circuit performs the interpolation operation when the difference between the read address value of the second device and the write address value of the first device does not fall within the specific range.

20. The audio playback system according to claim 11, wherein the first device is connected to the second device through a transmission interface, the second device writes the audio data into the audio memory through the transmission interface, and the transmission interface is a universal serial bus (USB).

* * * * *